United States Patent
Lee et al.

(10) Patent No.: US 7,809,505 B2
(45) Date of Patent: Oct. 5, 2010

(54) GEOMAGNETIC SENSOR AND AZIMUTH CALCULATION METHOD THEREOF

(75) Inventors: Woo-Jong Lee, Suwon-si (KR); Sang-on Choi, Suwon-si (KR)

(73) Assignee: Samsung Electronics Co., Ltd., Suwon (KR)

( * ) Notice: Subject to any disclaimer, the term of this patent is extended or adjusted under 35 U.S.C. 154(b) by 1113 days.

(21) Appl. No.: 11/451,477

(22) Filed: Jun. 13, 2006

(65) Prior Publication Data

US 2007/0124075 A1    May 31, 2007

(30) Foreign Application Priority Data

Nov. 25, 2005    (KR) .................. 10-2005-0113472

(51) Int. Cl.
  *G01C 19/36* (2006.01)
(52) U.S. Cl. ........................... 701/220; 702/85
(58) Field of Classification Search .......... 701/224; 702/85, 92–94, 17, 70, 190; 33/355 R, 356, 33/357
See application file for complete search history.

(56) References Cited

U.S. PATENT DOCUMENTS

| | | | |
|---|---|---|---|
| 5,953,683 A * | 9/1999 | Hansen et al. ............ | 702/95 |
| 6,536,123 B2 * | 3/2003 | Tamura ..................... | 33/356 |
| 6,543,146 B2 * | 4/2003 | Smith et al. .............. | 33/356 |
| 2002/0188416 A1 | 12/2002 | Zhou et al. | |
| 2003/0158699 A1 | 8/2003 | Townsend et al. | |
| 2004/0172838 A1 | 9/2004 | Satoh et al. | |
| 2005/0183274 A1 | 8/2005 | Cho et al. | |
| 2005/0229411 A1 | 10/2005 | Gnepf et al. | |

FOREIGN PATENT DOCUMENTS

EP    02/46695    6/2002

OTHER PUBLICATIONS

Extended European Search Report dated Apr. 24, 2007 issued in corresponding European Application No. 06123555.2.

* cited by examiner

*Primary Examiner*—Dalena Tran
(74) *Attorney, Agent, or Firm*—Staas & Halsey LLP

(57) ABSTRACT

A geomagnetic sensor with 3-axis acceleration sensors is provided. The geomagnetic sensor a geomagnetic measurement module including flux gates of X, Y and Z axes mutually crossing at right angles, a tilt measurement module including acceleration sensors of X, Y and Z axes mutually crossing at right angles, a tilt calculator primarily calculating a pitch angle and a roll angle using output values of each acceleration sensors of the X and Y axes, and performing second calculation by adjusting at least one of the primarily calculated pitch angle and roll angle using an output value of the acceleration sensor of the Z axis, and a controller calculating an azimuth using the readjusted pitch angle and roll angle and an output value of the geomagnetic measurement module. Accordingly, the pitch angle and roll angle are precisely measured to calculate the azimuth.

24 Claims, 5 Drawing Sheets

GEOMAGNETIC SENSOR AND AZIMUTH CALCULATION METHOD THEREOF

CROSS-REFERENCE TO RELATED APPLICATIONS

This application claims the benefit of Korean Patent Application No. 2005-0113472, filed Nov. 25, 2005, in the Korean Intellectual Property Office, the disclosure of which is incorporated herein by reference.

BACKGROUND OF THE INVENTION

1. Field of the Invention

The present invention relates to a geomagnetic sensor and an azimuth calculation method medium thereof. More particularly, the present invention relates to a geomagnetic sensor precisely calculating a pitch angle and a roll angle according to a region using 3-axis acceleration sensors to calculate an azimuth and an azimuth calculation method and medium thereof.

2. Description of the Related Art

A geomagnetic sensor is a device measuring the intensity and direction of geomagnetism, which a human can not feel, and more particularly, a sensor measuring the geomagnetism using a flux gate is called a flux gate geometric sensor.

The flux gate geometric sensor is a device measuring the intensity and direction of an external magnetic field by using a high permeability material such as permalloy as a magnetic core, adding excitation magnetic field through a coil winding the magnetic core, and measuring second harmonic component proportional to the external magnetic field generated according to magnetic saturation of the magnetic core and non-linear magnetic features. The flux gate geometric sensor was developed in the late 1930s and is good in sensitivity, cost-effective and miniaturized, compared with many kinds of other geomagnetic sensors.

Especially, as a micro electro mechanical system (MEMS) technology is nowadays developing, a micro flux gate sensor with low power consumption can be equipped in various portable electronic devices including a cell phone, personal digital assistant (PDA) and laptop computer using the technology.

Meanwhile, the geomagnetic sensor generally uses a 2 or 3 axis flux gate. When an azimuth is measured using the geomagnetic sensor, if the geomagnetic sensor is tilted, the azimuth can be miscalculated. Accordingly, an algorithm compensating the azimuth using a tilt angle, that is, a pitch angle and a roll angle is generally performed. Therefore, a conventional geomagnetic sensor calculates the pitch angle and the roll angle using 2-axis acceleration sensors to compensate the azimuth. In this case, the range of measuring a tilt is limited to ±90°.

In addition, the conventional geomagnetic sensor calculates the pitch angle and the roll angle by applying a function of $\sin^{-1}(\ )$ to a value of X axis and a value of Y axis of the acceleration sensor. However, if the tilt is over 60°, the tilt of a signal gets flat because of the nature of a sine function. In this case, if the resolving power of an analog to digital converter (ADC) converting an output value of the acceleration sensor into a digital value is not high enough, a tilt angle can not precisely be acquired. Specifically, if the tilt is over +90°, for example, if the tilt is 120°, +60° instead of +120° is recognized.

So, if an error occurs in the calculated pitch angle value and roll angle value, azimuth compensation does not work well so that the azimuth itself is miscalculated.

SUMMARY OF THE INVENTION

Additional aspects and/or advantages of the invention will be set forth in part in the description which follows and, in part, will be apparent from the description, or may be learned by practice of the invention.

An aspect of the present invention is to solve at least the above problems and/or disadvantages and to provide at least the advantages described below. Accordingly, an aspect of the present invention is to provide a geomagnetic sensor, which primarily calculates a pitch angle and a roll angle using 3-axis acceleration sensors, calculates the precise pitch angle and roll angle by readjusting the pitch angle and the roll angle using an output value of acceleration sensor of Z axis, and precisely compensates an azimuth using the pitch angle and the roll angle, and an azimuth calculation method thereof.

In order to achieve the above-described aspects of the present invention, there is provided a geomagnetic sensor, including a geomagnetic measurement module including flux gates of X, Y and Z axes mutually crossing at right angles, a tilt measurement module including acceleration sensors of X, Y and Z axes mutually crossing, at right angles, a tilt calculator primarily calculating a pitch angle and a roll angle using output values of each acceleration sensors of the X and Y axes, and performing second calculation by adjusting at least one of the primarily calculated pitch angle and roll angle using an output value of the acceleration sensor of the Z axis, and a controller calculating an azimuth using the readjusted pitch angle and roll angle and an output value of the geomagnetic measurement module.

The tilt measurement module may normalize the output values of each acceleration sensor of the X, Y and Z axes into values of a preset range, and transmit the normalized values to the tilt calculator.

The tilt calculator may primarily calculate $\theta_X, \phi_Y, \theta_Z$, and $\phi_Z$ using the acceleration sensors of X, Y and Z axes.

The tilt calculator can perform the second calculation in a manner that when the $\theta_X$ is between 0° and 45°, if the $\theta_Z$ is 0° or more, the $\theta_X$ becomes the pitch angle, or if the $\theta_Z$ is under 0°, $180°-\theta_X$ becomes the pitch angle, when the $\theta_X$ is 45° or more, if $\phi_Y$ is under 45°, $90°-_Z$ becomes the pitch angle, or if the $\phi_Y$ is 45° or more, the $\theta_X$ becomes the pitch angle, when the $\theta_X$ is between −45° and 0°, if the $\theta_Z$ is 0° or more, the $\theta_X$ becomes the pitch angle, or if the $\theta_Z$ is under 0°, $-180°-\theta_X$ becomes the pitch angle, or when the $\theta_X$ is under −45°, if the $\phi_Y$ is under 45°, $\theta_Z-90°$ becomes the pitch angle, or if the $\phi_Y$ is 45° or more, the $\theta_X$ becomes the pitch angle.

Meanwhile, the tilt calculator may perform the second calculation in a manner that when the $\phi_Y$ is between 0° and 45°, if the $\phi_Z$ is 0° or more, the $\phi_Z$ becomes the roll angle, or if the $\phi_Z$ is under 0°, $180°-\phi_Y$ becomes the roll angle, when the $\phi_Y$ is 45° or more, if the $\phi_X$ is under 45°, $90°-\phi_Z$ becomes the roll angle or if the $\theta_X$ is 45° or more, the $\phi_Y$ becomes the roll angle, when the $\phi_Y$ is between −45° and 0°, if the $\phi_Z$ is 0° or more, the $\phi_Y$ becomes the roll angle, or if the $\phi_Z$ is under 0°, $-180°-\phi_Y$ becomes the roll angle, or when the $\phi_Y$ is under −45°, if the $\theta_X$ is under 45°, $\phi_Z-90°$ becomes the roll angle, or if the $\theta_X$ is 45° or more, the $\phi_Y$ becomes the roll angle.

The geomagnetic measurement module may normalize the output values of each flux gate of the X, Y and Z axes into values of a preset range, and provides the normalized values to the controller.

The controller calculates the azimuth by applying the normalized output values of each flux gate of the X, Y and Z and the readjusted pitch angle and roll angle to a predetermined equation.

A method and medium of calculating an azimuth according to an embodiment of the present invention includes (a) calculating output values of flux gates of X, Y and Z axes using the flux gates of the X, Y and Z axes mutually crossing at right angles, (b) primarily calculating a pitch angle and a roll angle using acceleration sensors of X, Y and Z axes mutually crossing at right angles, (c) adjusting at least one of the primarily calculated pitch angle and roll angle using an output value of the acceleration sensor of the Z axis, and (d) calculating the azimuth using the readjusted pitch angle and roll angle and an output value of a geomagnetic measurement module.

In the step of (b), the output values of each acceleration sensor of the X, Y and Z axes may be normalized into values of a preset range using predetermined equations.

In the step of (b), $\theta_X$, $\phi_Y$, $\theta_Z$, and $\phi_Z$ may primarily be calculated using the acceleration sensors of X, Y and Z axes.

In the step of (c), the pitch angle may be readjusted in a manner that when the ex is between 0° and 45°, if the $\theta_Z$ is 0° or more, the $\theta_X$ becomes the pitch angle, or if the $\theta_Z$ is under 0°, 180°−$\theta_X$ becomes the pitch angle, when the $\theta_X$ is 45° or more, if $\phi_Y$ is under 45°, 90°−$\theta_Z$ becomes the pitch angle, or if the $\phi_Y$ is 45° or more, the $\theta_X$ becomes the pitch angle, when the $\theta_X$ is between −45° and 0°, if the $\theta_Z$ is 0° or more, the $\theta_X$ becomes the pitch angle, or if the $\theta_Y \theta_Z$ is under 0°, −180°−$\theta_X$ becomes the pitch angle, or when the $\theta_X$ is under −45°, if the $\phi_Y$ is under 45°, $\theta_Z$−90° becomes the pitch angle, or if the $\phi_Y$ is 45° or more, the $\theta_X$ becomes the pitch angle.

In the step of (c), the roll angle may be readjusted in a manner that when the $\phi_Y$ is between 0° and 45°, if the $\phi_Z$ is 0° or more, the $\phi_Z$ becomes the roll angle, or if the $\phi_Z$ is under 0°, 180°−$\phi_Y$ becomes the roll angle, when the $\phi_Y$ is 45° or more, if the $\phi_X$ is under 45°, 90°−$\phi_Z$ becomes the roll angle, or if the $\theta_X$ is 45° or more, the $\phi_Y$ becomes the roll angle, when the $\phi_Y$ is between −45° and 0°, if the $\phi_Z$ is 0° or more, the $\phi_Y$ becomes the roll angle, or if the $\phi_Z$ is under 0°, −180°−$\phi_Y$ becomes the roll angle, or when the $\phi_Y$ is under −45°, if the $\theta_X$ is under −45°, $\phi_Z$−90° becomes the roll angle, or if the $\theta_X$ is 45° or more, the $\phi_Y$ becomes the roll angle.

Meanwhile, in the step of (a), the output values of each flux gate of the X, Y and Z axes can be normalized into values of a preset range using predetermined equations.

In addition, in the step of (d), the azimuth can be calculated by applying the normalized output values of each flux gate of the X, Y and Z and the readjusted pitch angle and roll angle to predetermined equation:

BRIEF DESCRIPTION OF THE DRAWINGS

These and/or other aspects, features, and advantages of the invention will become apparent and more readily appreciated from the following description of exemplary embodiments, taken in conjunction with the accompanying drawings of which.

DETAILED DESCRIPTION OF THE PREFERRED EMBODIMENTS

Reference will now be made in detail to exemplary embodiments of the present invention, examples of which are illustrated in the accompanying drawings, wherein like reference numerals refer to the like elements throughout. Exemplary embodiments are described below to explain the present invention by referring to the figures.

Hereinafter, an exemplary embodiment of the present invention will be described in detail with reference to the accompanying drawing figures.

Figure 1:
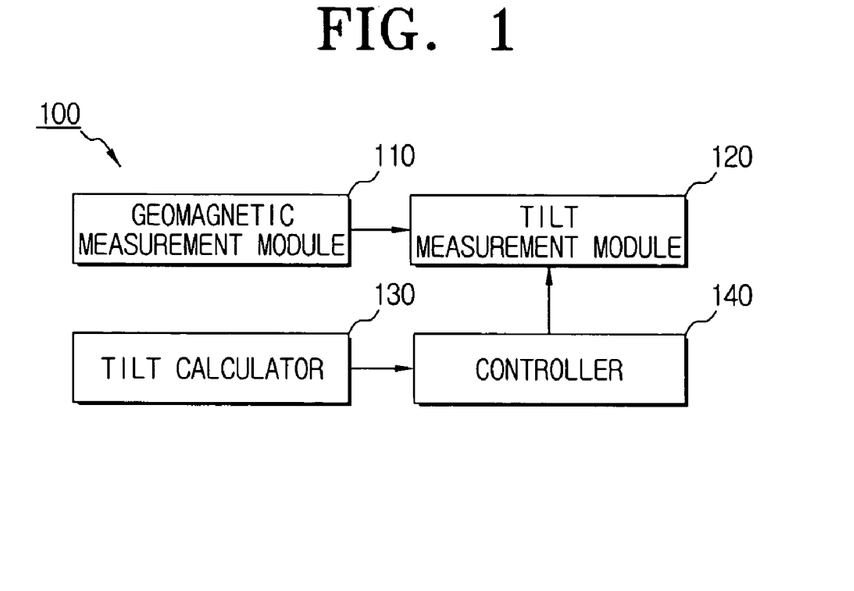
FIG. 1 is a block diagram showing the configuration of a geomagnetic sensor according to an exemplary embodiment of the present invention.

FIG. 1 is a block diagram showing the configuration of a geomagnetic sensor according to an exemplary embodiment of the present invention. According to FIG. 1, the geomagnetic sensor 100 includes a geomagnetic measurement module 110, a tilt measurement module 120, a tilt calculator 130 and a controller 140.

The geomagnetic measurement module 110 outputs a voltage value corresponding to an external geomagnetism. In detail, the geomagnetic measurement module 110 can include flux gates of X, Y and Z axes mutually crossing at right angles. Accordingly, an output value corresponding to the geomagnetism can be obtained by supplying an electric signal to each axis flux gate.

The tilt measurement module 120 outputs a voltage value corresponding to the tilt of the main body of the geomagnetic sensor 100. Specifically, the tilt measurement module 120 has acceleration sensors of X, Y and Z axes mutually crossing at right angles. Accordingly, an output value of acceleration sensor of each axis corresponding to the tilt can be obtained by supplying an electric signal to each axis acceleration sensor.

Figure 2:
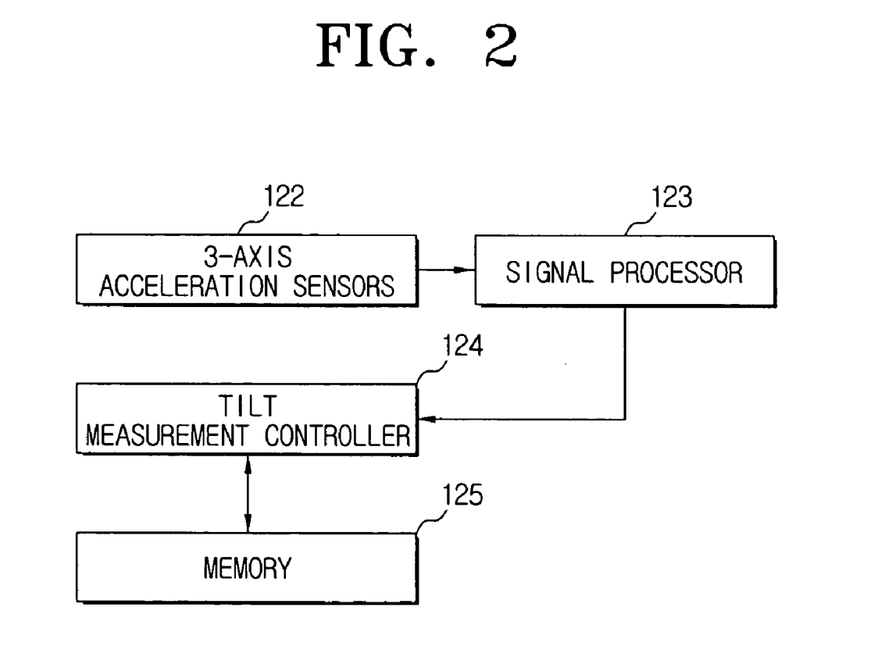
FIG. 2 is a block diagram showing an example of the configuration of the tilt measurement module used in the geomagnetic sensor of FIG. 1.

FIG. 2 is a block diagram showing an example of the configuration of the tilt measurement module 120. According to FIG. 2, the tilt measurement module 120 includes 3-axis acceleration sensors 122, a signal processor 123, a tilt measurement controller 124 and a memory 125.

The 3-axis acceleration sensors 122 consist of acceleration sensors of X, Y and Z axes mutually crossing at right angles.

The signal processor 123 converts output values of each acceleration sensor of X, Y and Z axes into a digital value, and transmits the digital value to the tilt measurement controller 124.

The tilt measurement controller 124 normalizes the output values of each acceleration sensor of X, Y and Z axes received from the signal processor 123 by mapping it with a value of a preset range. The normalization ranges from −1 to +1. The normalization can be performed as below.

$$AX_{norm} = \frac{(AX_{raw} - AX_{offset})}{AX_{Scale}} \quad \text{[Equation 1]}$$

$$AY_{norm} = \frac{(AY_{raw} - AY_{offset})}{AY_{Scale}}$$

$$AZ_{norm} = \frac{(AZ_{raw} - AZ_{offset})}{AZ_{Scale}}$$

In Equation1, $AX_{norm}$, $AY_{norm}$ and $AZ_{norm}$ are the normalized output value of each acceleration sensor of X, Y and Z axes respectively, $AX_{raw}$, $AY_{raw}$, and $AZ_{raw}$ are the real output value of each acceleration sensor of X, Y and Z axes respectively, $AX_{offset}$, $AY_{offset}$ and $AZ_{offset}$ are the preset offset value of each acceleration sensor of X, Y and Z axes respectively, and $AX_{Scale}$, $AY_{Scale}$ and $AZ_{Scale}$ are the preset scale value of each acceleration sensor of X, Y and Z axes respectively.

As described above, to map the output values of each acceleration sensor of X, Y and Z axes from −1 to +1, if $AX_{norm}$, $AY_{norm}$ and $AZ_{norm}$ are over +1, $AX_{norm}$, $AY_{norm}$ and $AZ_{norm}$ may be fixed to +1, and if $AX_{norm}$, $AY_{norm}$ and $AZ_{norm}$ are under −1, $AX_{norm}$, $AY_{norm}$ and $AZ_{norm}$ may be fixed to −1.

For the offset value and scale value of each acceleration sensor, a value used in a previous normalization process can be stored in the memory 125 and be read for use.

Alternatively, the offset value and scale value can be calculated as below.

$$AX_{offset} = \frac{(AX_{max} + AX_{min})}{2}, \quad AX_{Scale} = \frac{(AX_{max} - AX_{min})}{2}$$
$$AY_{offset} = \frac{(AY_{max} + AY_{min})}{2}, \quad AY_{Scale} = \frac{(AY_{max} - AY_{min})}{2}$$
$$AZ_{offset} = \frac{(AZ_{max} + AZ_{min})}{2}, \quad AZ_{Scale} = \frac{(AZ_{max} - AZ_{min})}{2}$$

[Equation 2]

In Equation 2, $AX_{max}$, $AY_{max}$ and $AZ_{max}$ are the maximum value of $AX_{raw}$, $AY_{raw}$ and $AZ_{raw}$ respectively, and $AX_{min}$, $AY_{min}$ and $AZ_{min}$ are the minimum value of $AX_{raw}$, $AY_{raw}$ and $AZ_{raw}$ respectively. $AX_{max}$, $AY_{max}$, $AZ_{max}$, $AX_{min}$, $AY_{min}$ and $AZ_{min}$ can be generated by selecting the maximum and minimum values among $AX_{raw}$, $AY_{raw}$ and $AZ_{raw}$ measured by rotating the geomagnetic sensor 100 at least once in a preparation step before azimuth measurement, and be stored in the memory 125. Accordingly, $AX_{max}$, $AY_{max}$, $AZ_{max}$, $AX_{min}$, $AY_{min}$ and $AZ_{min}$ can be read to use in the normalization process.

Returning to FIG. 1, the tilt calculator 130 receives the normalized output value of each acceleration sensor of X, Y and Z axes from the tilt measurement module 120, and primarily calculates the pitch angle and the roll angle. The pitch angle and roll angle are primarily calculated as follows.

$$\theta_X = \sin^{-1}(AX_{norm})$$
$$\phi_Y = \sin^{-1}(AY_{norm}/\cos\theta_X)$$
$$\theta_Z = \sin^{-1}(AZ_{mod}) \left\{ \text{wherein, } AZ_{mod} = \frac{AZ_{norm}}{\cos\phi_Y} \right\}$$
$$\phi_Z = \sin^{-1}(AZ_{mod}/\cos\theta_X) \left\{ \text{wherein, } AZ_{mod} = \frac{AZ_{norm}}{\cos\theta_X} \right\}$$

[Equation 3]

In Equation 3, $\theta_X$ is the pitch angle calculated using the acceleration sensor of X axis, $\phi_Y$ is the roll angle calculated using the acceleration sensor of Y axis, $\theta_Z$ is the pitch angle calculated using the acceleration sensor of Z axis, and $\phi_Z$ is the roll angle calculated using the acceleration sensor of Z axis.

Meanwhile, in Equation 3, $\cos\phi_Y$ and $\cos\theta_X$ are located in the denominator. Therefore, if $\theta_X$ or $\phi_Y$ is 90°, the denominator becomes 0 so that an error occurs. To prevent this, $\theta_X$ and $\phi_Y$ of 90° are replaced with 89° or 91°.

$AX_{norm}$, $AY_{norm}$, $AZ_{norm}$, and $AZ_{mod}$ are saturated not to be over the range of ±1. That is, to apply to Equation 3, over +1 is fixed to +1 and under −1 is fixed to −1.

Meanwhile, Equation 3 varies according to an exemplary embodiment. That is, $\theta_Z$ can be calculated using $\cos^{-1}(AZ_{norm})$.

The tilt calculator 130 performs the secondary calculation to finalize the pitch angle and roll angle according to the size of the primarily calculated $\theta_X$, $\phi_Y$, $\theta_Z$ and $\phi_Z$. In detail, the tilt calculator 130 calculates the pitch angle by combination of $\theta_X$ and $\theta_Z$, and calculates the roll angle by combination of $\phi_Y$ and $\phi_Z$.

First, to calculate the pitch angle, the tilt calculator 130 determines if $\theta_X$ is between 0° and 45°. If $\theta_X$ is between 0° and 45°, it is determined if $\theta_Z$ is 0° or more. If $\theta_Z$ is 0° or more, $\theta_Z$ becomes the pitch angle. However, if $\theta_Z$ is under 0°, 180°−$\theta_X$ becomes the pitch angle. As described above, in the case of the function of $\sin^{-1}()$, the resolving power decreases on the basis of 45°. If the acceleration sensor of X axis is tilted on the basis of Y axis, Z axis becomes tilted. If the acceleration sensor of X axis is tilted by 45° or more, $\theta_Z$ becomes lower than 0° so that 180°−$\theta_X$ becomes a precise pitch angle. According to this theory, the secondary calculation for the pitch angle and roll angle can be performed using the pitch angle $\theta_Z$ and roll angle $\phi_Z$ measured by the acceleration sensor of Z axis.

Meanwhile, if $\theta_X$ is 45° or more, it is determined if $\phi_Y$ is 45° or more. If $\phi_Y$ is 45° or more, $\theta_X$ becomes the pitch angle. Or, if $\phi_Y$ is under 45°, 90°−$\theta_Z$ becomes the pitch angle.

If $\theta_X$ is between −45° and 0°, it is determined if $\theta_X$ is 0° or more. If $\theta_Z$ is 0° or more, $\theta_X$ becomes the pitch angle. Or, if $\theta_Z$ is under 0°, −180°−$\theta_X$ becomes the pitch angle.

If $\theta_X$ is under −45°, it is determined if $\phi_Y$ is 45° or more. If $\phi_Y$ is 45° or more, $\theta_X$ becomes the pitch angle. However, if $\phi_Y$ is under 45°, $\theta_Z$−90° becomes the pitch angle. In this method, the pitch angle can finally be determined.

Next, to calculate the roll angle, first it is determined if $\phi_Z$ is between 0° and 45°. If $\phi_Y$ is between 0° and 45°, it is determined if $\phi_Z$ is 0° or more. If $\phi_Z$ is 0° or more, $\phi_Z$ becomes the roll angle. However, if $\phi_Z$ is under 0°, 180°−$\phi_Y$ becomes the roll angle.

Meanwhile, if $\phi_Y$ is 45° or more, it is determined if $\theta_X$ is 45° or more. If $\theta_X$ is 45° or more, $\phi_Y$ becomes the roll angle. However, if $\phi_X$ is under 45°, 90°−$\phi_Z$ becomes the roll angle.

Meanwhile, if $\phi_Y$ is between −45° and 0°, it is determined if $\phi_Z$ is 0° or more. If $\phi_Z$ is 0° or more, $\phi_Y$ becomes the roll angle. However, if $\phi_Z$ is under 0°, −180°−$\phi_Y$ becomes the roll angle.

Furthermore, if $\phi_Y$ is under −45°, it is determined if $\phi_X$ is 45° or more. If $\theta_X$ is 45° or more, $\phi_Y$ becomes the roll angle. However, if $\theta_X$ is under 45°, $\phi_Z$−90° becomes the roll angle. In this method, the roll angle can finally be determined.

The controller 140 can calculate an azimuth using the secondarily calculated and readjusted pitch angle and roll angle. To calculate the azimuth, the geomagnetic measurement module 110 normalizes the output values of each flux gate of X, Y and Z axes using equations below to transmit to the controller 140.

$$X_{norm} = \frac{(X_{raw} - X_{offset})}{X_{Scale}}$$
$$Y_{norm} = \frac{(Y_{raw} - Y_{offset})}{Y_{Scale}}$$

[Equation 4]

-continued $$Z_{norm} = \frac{(Z_{raw} - Z_{offset})}{Z_{Scale}}$$

where $X_{norm}$, $Y_{norm}$ and $Z_{norm}$ are the normalized output value of each flux gate of X, Y and Z axes respectively, $X_{raw}$, $Y_{raw}$ and $Z_{raw}$ are the real output value of each flux gate of X, Y and Z axes respectively, $X_{offset}$, $Y_{offset}$ and $Z_{offset}$ are the preset offset value of each flux gate of X, Y and Z axes respectively, and $X_{Scale}$, $Y_{Scale}$ and $Z_{Scale}$ are the preset scale value of each flux gate of X, Y and Z axes respectively.

$X_{offset}$, $Y_{offset}$, $Z_{offset}$, $X_{Scale}$, $Y_{Scale}$ and $Z_{Scale}$ can be stored in the geomagnetic measurement module 110's own memory (not shown); or can directly be calculated using an equation of the same form of Equation 2. As the detailed configuration of the geomagnetic measurement module 110 is conventional and is similar to that of the tilt measurement module 120 in FIG. 2, a drawing and description of the geomagnetic measurement module 110 is omitted.

The controller 140 applies the readjusted pitch angle and roll angle and the normalized output value of each flux gate of X, Y and Z axes to the below equation to calculate the azimuth.

$$\psi = \tan^{-1}\left( \frac{Y_{norm} * \cos\phi - Z_{norm} * \sin\phi}{X_{norm} * \cos\theta - Y_{norm} * \sin\theta * \sin\phi - Z_{norm} * \sin\theta * \cos\phi} \right) \quad [\text{Equation 5}]$$

In Equation 5, $X_{norm}$, $Y_{norm}$ and $Z_{norm}$ are the normalized output value of each flux gate of X, Y and Z axes respectively, $\phi$ is the pitch angle, and $\phi$ is the roll angle. Equation 5 is an equation corresponding to when a value of Z axis vertical to a horizontal plane is set to a negative number. In other words, Equation 5 is effective in a case where the 3-axis geomagnetic sensor 100 is horizontally located on the earth surface of the 3-axis Northern Hemisphere as in FIG. 3 when the 3-axis geomagnetic sensor 100 is located as in FIG. 3. In this case, the normalized value of Z axis is obtained as a negative value.

Meanwhile, signs in Equations 3 and 5 change according to the location of the axes in the 3-axis flux gates of the geomagnetic measurement module 110 and the 3-axis acceleration sensors of the tilt measurement module 120. The signs in Equations 3 and 5, change in a case where the pitch angle is greater than 90° when the azimuth is calculated. For example, if the pitch angle is 120°, signals of X and Y axes of the signals of the geomagnetic sensor 100 change their signs, and the acceleration sensor changes θ=θ−180 to apply to the equations.

Figure 3:
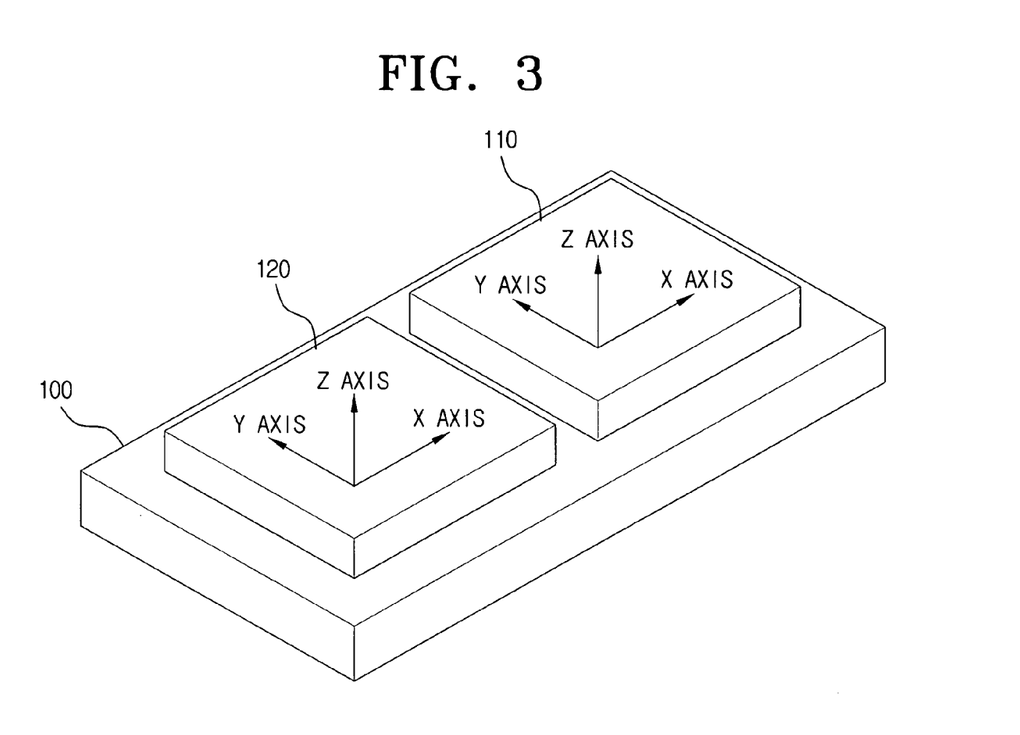
FIG. 3 shows an example of 3-axis location of the geomagnetic measurement module and the tilt measurement module in the geomagnetic sensor of FIG. 1.

FIG. 3 shows an example of 3-axis location in the 3-axis flux gates and 3-axis acceleration sensors. According to FIG. 3, each X axis of the geomagnetic measurement module 110 and the tilt measurement module 120 in the geomagnetic sensor 100 is located in the forward direction of the geomagnetic sensor 100, each Y axis is located in the direction perpendicular to each X axis on the same flat where the geomagnetic sensor 100 is located, and each Z axis is located in the upward direction of the geomagnetic sensor 100, crossing with X and Y axes at right angles. Equations 3 and 5 are applied when 3 axes are located as in FIG. 3.

Figure 4:
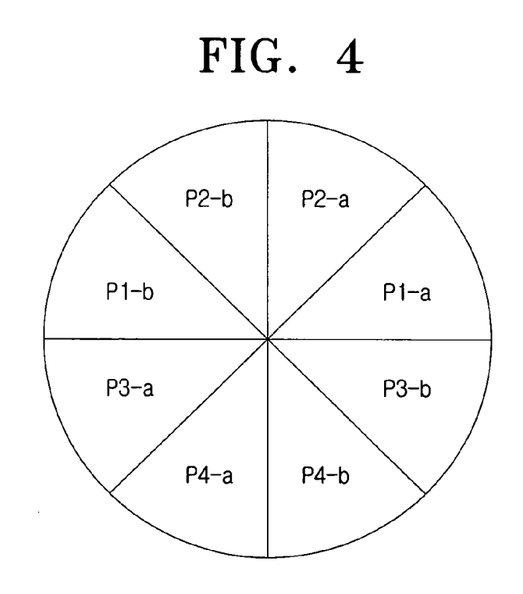
FIGS. 4 and 5 show a readjusted region of a pitch angle and a roll angle, respectively.

FIG. 4 is a graph entirely showing the region of the pitch angle. The region of the pitch angle is divided into 4 large regions P1~P4 according to the size of $\theta_X$, and each large region is divided into 2 small regions a and b.

Accordingly, if it is $0° \leq \theta_X < 45°$ and $\theta_Z \geq 0°$, the region of the pitch angle is recognized as an a region of P1, that is, P1-a, and $\theta_X$ becomes the pitch angle. However, if it is $0° \leq \theta_X < 45°$ and $\theta_Z < 0°$, the region of the pitch angle is recognized as P1-b and $180° - \theta_X$ becomes the pitch angle.

If it is $\theta_X \geq 45°$ and $\theta_Z \geq 0°$, the region of the pitch angle is recognized as P2-a and $\theta_X$ becomes the pitch angle. However, if it is $\theta_X \geq 45°$ and $\theta_Z < 0°$, the region of the pitch angle is recognized as P2-b and $90° - \theta_Z$ becomes the pitch angle.

If it is $-45° \leq \theta_X < 0°$ and $\theta_Z < 0°$, the region of the pitch angle is recognized as P3-a and $-180° - \theta_X$ becomes the pitch angle. However, if it is $-45° \leq \theta_X < 0°$ and $\theta_Z \geq 0°$, the region of the pitch angle is recognized as P3-b and $\theta_X$ becomes the pitch angle.

Meanwhile, if it is $\theta_X < -45°$, the region of the pitch angle is recognized as the large region of P4. In this case, the small region is determined according to the size of $\theta_Z$. That is, if it is $\theta_X < -45°$ and $\theta_Z < 0°$, the region of the pitch angle is recognized as P4-a. If it is $\phi_Y \geq 45°$ in the region of P4-a, $\theta_X$ becomes the pitch angle, or if it is $\phi_Y < 45°$ in the region of P4-a, $\theta_Z - 90°$ becomes the pitch angle. However, if it is $\theta_X < -45°$ and $\theta_Z \geq 0°$, the region of the pitch angle is recognized as P4-b. If it is $\phi_Y \geq 45°$ in the region of P4-b, $\theta_X$ becomes the pitch angle, or if it is $\phi_Y < 45°$ in the region of P4-b, $\theta_Z - 90°$ becomes the pitch angle.

Figure 5:
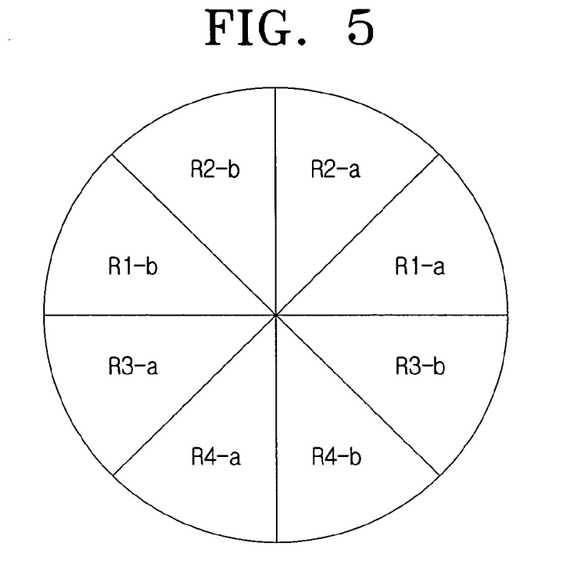

FIG. 5 is a graph entirely showing the region of the roll angle. The region of the roll angle is divided into 4 large regions R1~R4 according to the size of $\phi_Y$, and each large region is divided into 2 small regions a and b.

Accordingly, if it is $0° \leq \phi_Y < 45°$ and $\phi_Z \geq 0°$, the region of the roll angle is recognized as an a region of R1, that is, R1-a, and $\phi_Y$ becomes the roll angle. However, if it is $0° \leq \phi_Y < 45°$ and $\phi_Z < 0°$, the region of the roll angle is recognized as R1-b and $180° - \phi_Y$ becomes the roll angle.

If it is $\phi_Y \geq 45°$ and $\phi_Z \geq 0°$, the region of the roll angle is recognized as R2-a and $\phi_Y$ becomes the roll angle. However, if it is $\phi_Y \geq 45°$ and $\phi_Z < 0°$, the region of the roll angle is recognized as R2-b and $90° - \phi_Y$ becomes the roll angle.

If it is $-45° \leq \phi_Y < 0°$ and $\phi_Z < 0°$, the region of the roll angle is recognized as R3-a and $-180° - \phi_Y$ becomes the roll angle. However, if it is $-45° \leq \phi_Y \leq 0°$ and $\phi_Y \geq 0°$, the region of the roll angle is recognized as R3-b and $\phi_Y$ becomes the roll angle.

Meanwhile, if it is $\phi_Y < -45°$, the region of the roll angle is recognized as the large region of R4. In this case, the small region is determined according to the size of $\phi_Z$. That is, if it is $\phi_Y < -45°$ and $\phi_Z < 0°$, the region of the roll angle is recognized as R4-a. If it is $\theta_X \geq 45°$ in the region of R4-a, coy becomes the roll angle, or if it is $\theta_X < 45°$ in the region of R4-a, $\phi_Z - 90°$ becomes the roll angle.

Meanwhile, if it is $\phi_Y < -45°$ and $\phi_Z \geq 0°$, the region of the roll angle is recognized as R4-b. If it is $\theta_X \geq 45°$ in the region of R4-b, $\phi_Y$ becomes the roll angle, or if it is $\theta_X < 45°$ in the region of R4-b, $\phi_Z - 90°$ becomes the roll angle.

Referring to FIGS. 4 and 5, the pitch angle and roll angle can be measured in the range of ±180°.

Figure 6:
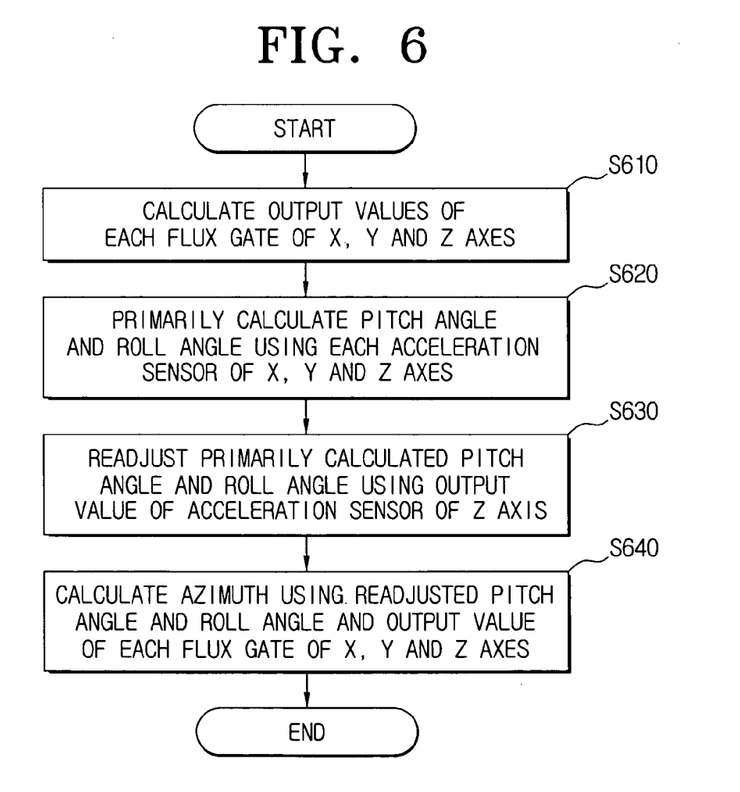
FIG. 6 is a flow chart showing an azimuth calculation method according to an exemplary embodiment of the present invention.

FIG. 6 is a flow chart showing an azimuth calculation method according to an exemplary embodiment of the present invention. According to FIG. 6, the output values of each flux gate of X, Y and Z axes is calculated and normalized (S610), and the pitch angle and roll angle are primarily calculated using each acceleration sensor of X, Y and Z axes (S620). Specifically, $\theta_X$, $\phi_Y$, $\theta_Z$ and $\phi_Z$ are primarily calculated.

Subsequently, the second calculation is performed to readjust $\theta_X$, $\phi_Y$, $\theta_Z$ and $\phi_Z$ using the output value of the acceleration sensor of Z axis (S630).

As a result of the second calculation, if the pitch angle and roll angle are finalized, the azimuth is calculated using the readjusted pitch angle and roll angle and the normalized output value of each flux gate of X, Y and Z axes (S640). The azimuth can be calculated using Equation 5.

Figure 7:
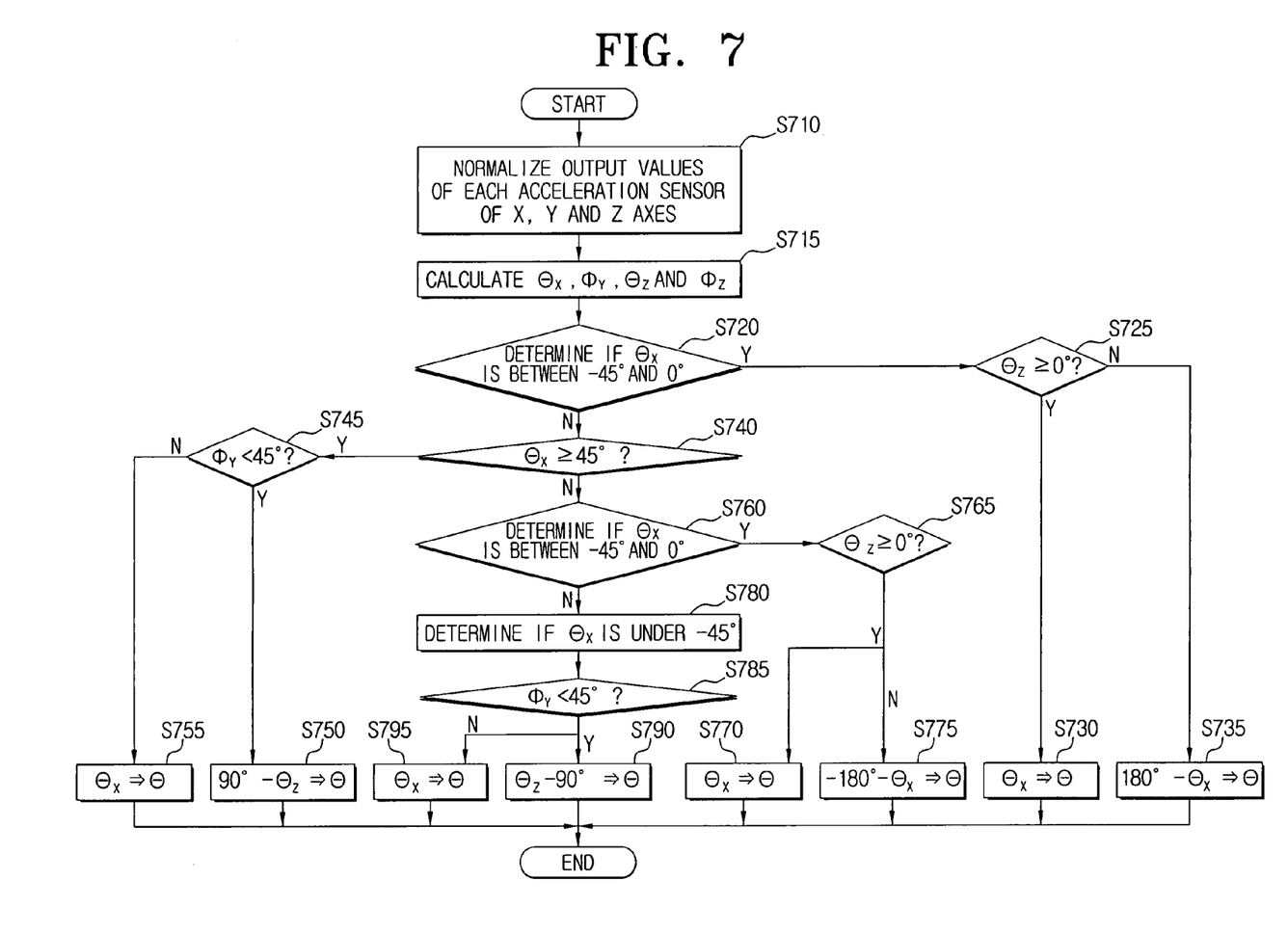
FIG. 7 is a flow chart showing an example of a pitch angle calculation method used in the azimuth calculation method of FIG. 6.

FIG. 7 is a flow chart specifically describing a pitch angle calculation method used in the azimuth calculation method of FIG. 6. According to FIG. 7, first the output values of each acceleration sensor of X, Y and Z axes is normalized by mapping it with a value of a predetermined range (S710). The normalization can be performed using Equation 1.

As a result, if $\theta_X$, $\phi_Y$, $\theta_Z$ and $\phi_Z$ are primarily calculated (S715), it is determined if $\theta_X$ is between 0° and 45° (S720). If $\theta_X$ is between 0° and 45°, it is determined if $\theta_Z$ is 0° or more (S725). If $\theta_Z$ is 0° or more, $\theta_X$ becomes the pitch angle (S730). However, if $\theta_Z$ is under 0°, 180°−$\theta_X$ becomes the pitch angle (S735).

Meanwhile, if $\theta_X$ is not between 0° and 45°, it is determined if $\theta_X$ is 45° or more (S740). As a result, if $\theta_X$ is 45° or more, it is determined if $\phi_Y$ is under 45° (S745). If $\phi_Y$ is under 45°, 90°−$\theta_Z$ becomes the pitch angle (S750). Or, if $\phi_Y$ is 45° or more, $\theta_X$ becomes the pitch angle (S755).

Meanwhile, if $\theta_X$ is neither between 0° and 45° nor 45° or more, it is determined if $\theta_X$ is between −45° and 0° (S760). If $\theta_X$ is between −45° and 0°, it is determined if $\theta_Z$ is 0° or more (S765). If $\theta_Z$ is 0° or more, $\theta_X$ becomes the pitch angle (S770). Or, if $\theta_Z$ is under 0°, −180°−$\theta_X$ becomes the pitch angle (S775).

Meanwhile, if $\theta_X$ is not between −45° and 0°, either, it is determined if $\theta_X$ is under −45° (S780). Also, it is determined if $\theta_Y$ is under 45° (S785). If $\phi_Y$ is under 45°, $\theta_Z$−90° becomes the pitch angle (S790). Or, if $\phi_Y$ is 45° or more, $\theta_X$ becomes the pitch angle (S795).

Figure 8:
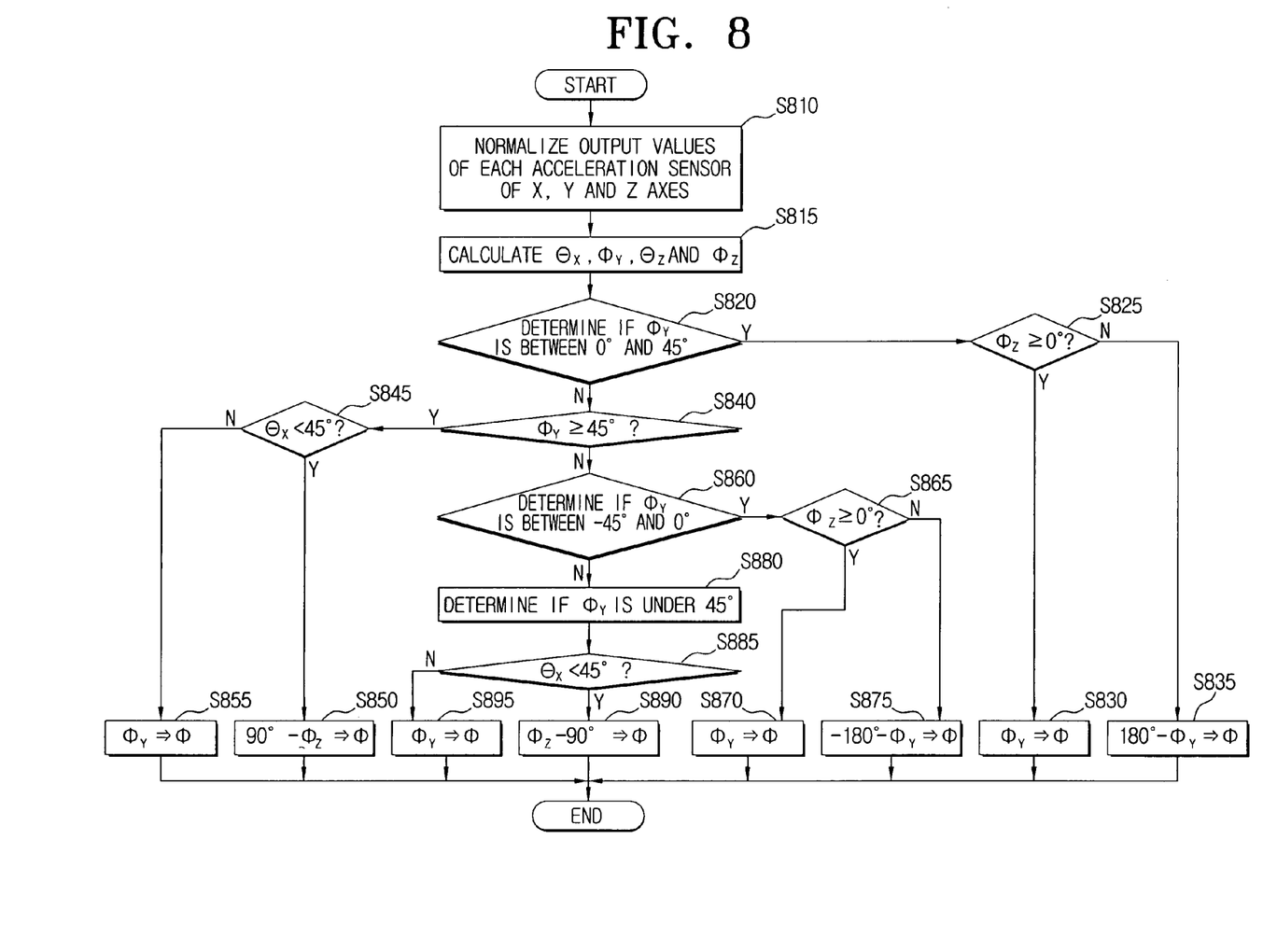
FIG. 8 is a flow chart showing an example of a roll angle calculation method used in the azimuth calculation method of FIG. 6.

FIG. 8 is a flow chart specifically describing a roll angle calculation method used in the azimuth calculation method of FIG. 6. According to FIG. 8, first the output values of each acceleration sensor of X, Y and Z axes is normalized by mapping it with a value of a predetermined range (S810). The normalization can be performed using Equation 1.

As a result, if $\theta_X$, $\phi_Y$, $\theta_Z$ and $\phi_Z$ are primarily calculated (S815), it is determined if $\phi_Y$ is between 0° and 45° (S820). If $\phi_Y$ is between 0° and 45°, it is determined if $\phi_Z$ is 0° or more (S825). If $\phi_Z$ is 0° or more, $\phi_Y$ becomes the roll angle (S830). However, if $\phi_Z$ is under 0°, 180°−$\phi_Y$ becomes the roll angle (S835).

Meanwhile, if $\phi_Y$ is not between 0° and 45°, it is determined if $\phi_Y$ is 45° or more (S840). As a result, if $\phi_Y$ is 45° or more, it is determined if $\theta_X$ is under 45° (S845). If $\theta_X$ is under 45°, 90°−$\phi_Z$ becomes the roll angle (S850). Or, if $\theta_X$ is 45° or more, $\phi_Y$ becomes the roll angle (S855).

Meanwhile, if $\phi_Y$ is neither between 0° and 45° nor 45° or more, it is determined if $\phi_Y$ is between −45° and 0° (S860). If $\phi_Y$ is between −45° and 0°, it is determined if $\phi_Z$ is 0° or more (S865). If $\phi_Z$ is 0° or more, $\phi_Y$ becomes the roll angle (S870). Or, if $\phi_Z$ is under 0°, −180°−$\phi_Y$ becomes the roll angle (S875).

Meanwhile, if $\phi_Y$ is not between −45° and 0°, either, it is determined if $\phi_Z$ is under −45° (S880). Also, it is determined if $\theta_X$ is under 45° (S885). If $\theta_X$ is under 45°, $\phi_Z$−90° becomes the roll angle (S890). Or, if $\theta_Y$ is 45° or more, $\phi_Y$ becomes the roll angle (S895).

Therefore, the pitch angle and roll angle are precisely calculated also in a region where the resolving power of an inverse tangent (ARCSIN) function decreases so that the azimuth can be compensated.

As can be appreciated from the above description, the pitch angle and roll angle are precisely calculated using 3-axis acceleration sensor. That is, the pitch angle and roll angle are primarily calculated using each acceleration sensor of X and Y axes, and the pitch angle and roll angle are readjusted by the second calculation using an output value of acceleration sensor of Z axis. Accordingly, even when the resolving power of the ADC is not high enough, the pitch angle and roll angle can be precisely calculated. Consequently, the azimuth can be precisely be calculated. In addition, the range of measuring the pitch angle and roll angle is extended from ±90° to ±180°.

In addition to the above-described exemplary embodiments, exemplary embodiments of the present invention can also be implemented by executing computer readable code/instructions in/on a medium, e.g., a computer readable medium. The medium can correspond to any medium/media permitting the storing and/or transmission of the computer readable code.

The computer readable code/instructions can be recorded/transferred in/on a medium in a variety of ways, with examples of the medium including magnetic storage media (e.g., floppy disks, hard disks, magnetic tapes, etc.), optical recording media (e.g., CD-ROMs, or DVDs), magneto-optical media (e.g., floptical disks), hardware storage devices (e.g., read only memory media, random access memory media, flash memories, etc.) and storage/transmission media such as carrier waves transmitting signals, which may include instructions, data structures, etc. Examples of storage/transmission media may include wired and/or wireless transmission (such as transmission through the Internet). Examples of wired storage/transmission media may include optical wires and metallic wires. The medium/media may also be a distributed network, so that the computer readable code/instructions is stored/transferred and executed in a distributed fashion. The computer readable code/instructions may be executed by one or more processors.

Although a few exemplary embodiments of the present invention have been shown and described, it would be appreciated by those skilled in the art that changes may be made in these exemplary embodiments without departing from the principles and spirit of the invention, the scope of which is defined in the claims and their equivalents.

What is claimed is:

1. A geomagnetic sensor, comprising:
a geomagnetic measurement module including flux gates of X, Y and Z axes mutually crossing at right angles;
a tilt measurement module including acceleration sensors of X, Y and Z axes mutually crossing at right angles;
a tilt calculator primarily calculating a pitch angle and a roll angle using output values of each acceleration sensor of the X and Y axes, and performing second calculation by adjusting at least one of the primarily calculated pitch angle and roll angle using an output value of the acceleration sensor of the Z axis; and
a controller calculating an azimuth using the adjusted pitch angle and roll angle and an output value of the geomagnetic measurement module.

2. The geomagnetic sensor of claim 1, wherein the tilt measurement module normalizes the output values of each acceleration sensor of the X, Y and Z axes into values of a preset range using the following equations, and transmits the normalized values to the tilt calculator:

$$AX_{norm} = \frac{(AX_{raw} - AX_{offset})}{AX_{Scale}}$$

$$AY_{norm} = \frac{(AY_{raw} - AY_{offset})}{AY_{Scale}} \text{ and,}$$

-continued $$AZ_{norm} = \frac{(AZ_{raw} - AZ_{offset})}{AZ_{Scale}}$$

where $AX_{norm}$, $AY_{norm}$ and $AZ_{norm}$ are the normalized output values of each acceleration sensor of the X, Y and Z axes respectively, $AX_{raw}$, $AY_{raw}$ and $AZ_{raw}$ are the real output values of each acceleration sensor of the X, Y and Z axes respectively, $AX_{offset}$, $AY_{offset}$ and $AZ_{offset}$ are the preset offset values of each acceleration sensor of the X, Y and Z axes respectively, and $AX_{Scale}$, $AY_{Scale}$ and $AZ_{Scale}$ are the preset scale values of each acceleration sensor of the X, Y and Z axes respectively.

3. The geomagnetic sensor of claim 2, wherein the tilt calculator primarily calculates the pitch angle and roll angle using the following equations:

$$\theta_X = \sin^{-1}(AX_{norm})$$
$$\phi_Y = \sin^{-1}(AY_{norm}/\cos\theta_X)$$
$$\theta_Z = \sin^{-1}(AZ_{mod}) \left\{\text{wherein, } AZ_{mod} = \frac{AZ_{norm}}{\cos\phi_Y}\right\} \text{ and}$$
$$\phi_Z = \sin^{-1}(AZ_{mod}/\cos\theta_X) \left\{\text{wherein, } AZ_{mod} = \frac{AZ_{norm}}{\cos\theta_X}\right\}$$

where $\theta_X$ is the pitch angle calculated using the acceleration sensor of the X axis, $\phi_Y$ is the roll angle calculated using the acceleration sensor of the Y axis, $\theta_Z$ is the pitch angle calculated using the acceleration sensor of the Z axis, and $\phi_Z$ is the roll angle calculated using the acceleration sensor of the Z axis.

4. The geomagnetic sensor of claim 3, wherein the tilt calculator performs the second calculation in a manner that when the $\theta_X$ is between 0° and 45°, if the $\theta_Z$ is 0° or more, the $\theta_X$ becomes the pitch angle, or if the $\theta_Z$ is under 0°, 180°−$\theta_X$ becomes the pitch angle, when the $\theta_X$ is 45° or more, if the $\phi_Y$ is under 45°, 90°−$\theta_Z$ becomes the pitch angle, or if the $\phi_Y$ is 45° or more, the $\theta_X$ becomes the pitch angle, when the $\theta_X$ is between −45° and 0°, if the $\theta_Z$ is 0° or more, the $\theta_X$ becomes the pitch angle, or if the $\theta_Z$ is under 0°, −180°−$\theta_X$ becomes the pitch angle, or when the $\theta_X$ is under −45°, if the $\phi_Y$ is under 45°, $\theta_Z$−90° becomes the pitch angle, or if the $\phi_Y$ is 45° or more, the $\theta_X$ becomes the pitch angle.

5. The geomagnetic sensor of claim 4, wherein the tilt calculator performs the second calculation in a manner that when the $\phi_Y$ is between 0° and 45°, if the $\phi_Z$ is 0° or more, the $\phi_Y$ becomes the roll angle, or if the $\phi_Z$ is under 0°, 180°−$\phi_Y$ becomes the roll angle, when the $\phi_Y$ is 45° or more, if the $\phi_X$ is under 45°, 90°−$\phi_Z$ becomes the roll angle, or if the $\theta_X$ is 45° or more, the $\phi_Y$ becomes the roll angle, when the $\phi_Y$ is between −45° and 0°, if the $\phi_Z$ is 0° or more, the $\phi_Y$ becomes the roll angle, or if the $\phi_Z$ is under 0°, −180°−$\phi_Y$ becomes the roll angle, or when the $\phi_Y$ is under −45°, if the $\theta_X$ is under 45°, $\phi_Z$−90° becomes the roll angle, or if the $\theta_X$ is 45° or more, the $\phi_Y$ becomes the roll angle.

6. The geomagnetic sensor of claim 1, wherein the geomagnetic measurement module normalizes the output values of each flux gate of the X, Y and Z axes into values of a preset range using the following equations, and provides the normalized values to the controller:

$$X_{norm} = \frac{(X_{raw} - X_{offset})}{X_{Scale}}$$
$$Y_{norm} = \frac{(Y_{raw} - Y_{offset})}{Y_{Scale}} \text{ and,}$$
$$Z_{norm} = \frac{(Z_{raw} - Z_{offset})}{Z_{Scale}}$$

where $X_{norm}$, $Y_{norm}$ and $Z_{norm}$ are the normalized output values of each flux gate of the X, Y and Z axes respectively, $X_{raw}$, $Y_{raw}$ and $Z_{raw}$ are the real output values of each flux gate of the X, Y and Z axes respectively, $X_{offset}$, $Y_{offset}$ and $Z_{offset}$ are the preset offset values of each flux gate of the X, Y and Z axes respectively, and $X_{Scale}$, $Y_{Scale}$ and $Z_{Scale}$ are the preset scale values of each flux gate of the X, Y and Z axes respectively.

7. The geomagnetic sensor of claim 6, wherein the controller calculates the azimuth by applying the normalized output values of each flux gate of the X, Y and Z and the readjusted pitch angle and roll angle to the following equation:

$$\psi = \tan^{-1}\left(\frac{Y_{norm}*\cos\phi - Z_{norm}*\sin\phi}{X_{norm}*\cos\theta - Y_{norm}*\sin\theta*\sin\phi - Z_{norm}*\sin\theta*\cos\phi}\right),$$

where $X_{norm}$, $Y_{norm}$ and $Z_{norm}$ are the normalized output values of each flux gate of the X, Y and Z axes respectively, $\theta$ is the pitch angle, and $\phi$ is the roll angle.

8. A method of calculating an azimuth, comprising:
(a) calculating output values of flux gates of X, Y and Z axes using the flux gates of the X, Y and Z axes mutually crossing at right angles;
(b) primarily calculating a pitch angle and a roll angle using acceleration sensors of X, Y and Z axes mutually crossing at right angles;
(c) adjusting at least one of the primarily calculated pitch angle and roll angle using an output value of the acceleration sensor of the Z axis; and
(d) calculating the azimuth using the adjusted pitch angle and roll angle and an output value of a geomagnetic measurement module.

9. The method of claim 8, wherein in the step of (b), the output values of each acceleration sensor of the X, Y and Z axes are normalized into values of a preset range using the following equations:

$$AX_{norm} = \frac{(AX_{raw} - AX_{offset})}{AX_{Scale}}$$
$$AY_{norm} = \frac{(AY_{raw} - AY_{offset})}{AY_{Scale}} \text{ and,}$$
$$AZ_{norm} = \frac{(AZ_{raw} - AZ_{offset})}{AZ_{Scale}}$$

where $AX_{norm}$, $AY_{norm}$ and $AZ_{norm}$ are the normalized output values of each acceleration sensor of the X, Y and Z axes respectively, $AX_{raw}$, $AY_{raw}$ and $AZ_{raw}$ are the real output values of each acceleration sensor of the X, Y and Z axes respectively, $AX_{offset}$, $AY_{offset}$ and $AZ_{offset}$ are the preset offset values of each acceleration sensor of the X, Y and Z axes respectively, and $AX_{Scale}$, $AY_{Scale}$ and $AZ_{Scale}$ are the preset scale values of each acceleration sensor of the X, Y and Z axes respectively.

10. The method of claim 9, wherein in the step of (b), the pitch angle and roll angle are primarily calculated using the following equations:

$$\theta_X = \sin^{-1}(AX_{norm})$$

$$\phi_Y = \sin^{-1}(AY_{norm}/\cos\theta_X)$$

$$\theta_Z = \sin^{-1}(AZ_{mod}) \left\{ \text{wherein, } AZ_{mod} = \frac{AZ_{norm}}{\cos\phi_Y} \right\} \text{ and}$$

$$\phi_Z = \sin^{-1}(AZ_{mod}/\cos\theta_X) \left\{ \text{wherein, } AZ_{mod} = \frac{AZ_{norm}}{\cos\theta_X} \right\},$$

where $\theta_X$ is the pitch angle calculated using the acceleration sensor of the X axis, $\phi_Y$ is the roll angle calculated using the acceleration sensor of the Y axis, $\theta_Z$ is the pitch angle calculated using the acceleration sensor of the Z axis, and $\phi_Z$ is the roll angle calculated using the acceleration sensor of the Z axis.

11. The method of claim 10, wherein in the step of (c), the pitch angle is readjusted in a manner that when the $\theta_X$ is between 0° and 45°, if the $\theta_Z$ is 0° or more, the $\theta_X$ becomes the pitch angle, or if the $\theta_Z$ is under 0°, 180°−$\theta_X$ becomes the pitch angle, when the $\theta_X$ is 45° or more, if $\phi_Y$ is under 45°, 90°−$\theta_Z$ becomes the pitch angle, or if the $\phi_Y$ is 45° or more, the $\theta_X$ becomes the pitch angle, when the $\theta_X$ is between −45° and 0°, if the $\theta_Z$ is 0° or more, the $\theta_X$ becomes the pitch angle, or if the $\theta_Z$ is under 0°, −180°−$\theta_X$ becomes the pitch angle, or when the $\theta_X$ is under −45°, if the $\phi_Y$ is under 45°, $\theta_Z$−90° becomes the pitch angle, or if the $\phi_Y$ is 45° or more, the $\theta_X$ becomes the pitch angle.

12. The method of claim 11, wherein in the step of (c), the roll angle is readjusted in a manner that when the $\phi_Y$ is between 0° and 45°, if the $\phi_Z$ is 0° or more, the $\phi_Z$ becomes the roll angle, or if the $\phi_Z$ is under 0°, 180°−$\phi_Y$ becomes the roll angle, when the $\phi_Y$ is 45° or more, if the $\theta_X$ is under 45°, 90°−$\phi_Z$ becomes the roll angle, or if the $\theta_X$ is 45° or more, the $\phi_Y$ becomes the roll angle, when the $\phi_Y$ is between −45° and 0°, if the $\phi_Z$ is 0° or more, the $\phi_Y$ becomes the roll angle, or if the $\phi_Z$ is under 0°, −180°−$\phi_Y$ becomes the roll angle, or when the $\phi_Y$ is under −45°, if the $\theta_X$ is under 45°, $\phi_Z$−90° becomes the roll angle, or if the $\theta_X$ is 45° or more, the $\phi_Y$ becomes the roll angle.

13. The method of claim 9, wherein in the step of (a), the output values of each flux gate of the X, Y and Z axes are normalized into values of a preset range using the following equations:

$$X_{norm} = \frac{(X_{raw} - X_{offset})}{X_{Scale}}$$

$$Y_{norm} = \frac{(Y_{raw} - Y_{offset})}{Y_{Scale}} \text{ and,}$$

$$Z_{norm} = \frac{(Z_{raw} - Z_{offset})}{Z_{Scale}}$$

where $X_{norm}$, $Y_{norm}$ and $Z_{norm}$ are the normalized output values of each flux gate of the X, Y and Z axes respectively, $X_{raw}$, $Y_{raw}$ and $Z_{raw}$ are the real output values of each flux gate of the X, Y and Z axes respectively, $X_{offset}$, $Y_{offset}$ and $Z_{offset}$ are the preset offset values of each flux gate of the X, Y and Z axes respectively, and $X_{Scale}$, $Y_{Scale}$ and $Z_{Scale}$ are the preset scale values of each flux gate of the X, Y and Z axes respectively.

14. The method of claim 13, wherein in the step of (d), the azimuth is calculated by applying the normalized output values of each flux gate of the X, Y and Z and the readjusted pitch angle and roll angle to the following equation:

$$\psi = \tan^{-1}\left( \frac{Y_{norm} * \cos\phi - Z_{norm} * \sin\phi}{X_{norm} * \cos\theta - Y_{norm} * \sin\theta * \sin\phi - Z_{norm} * \sin\theta * \cos\phi} \right),$$

where $X_{norm}$, $Y_{norm}$ and $Z_{norm}$ are the normalized output values of each flux gate of the X, Y and Z axes respectively, $\theta$ is the pitch angle, and $\phi$ is the roll angle.

15. At least one computer readable medium storing instructions that control at least one processor to perform a method of calculating an azimuth, comprising:

(a) calculating output values of flux gates of X, Y and Z axes using the flux gates of the X, Y and Z axes mutually crossing at right angles;

(b) primarily calculating a pitch angle and a roll angle using acceleration sensors of X, Y and Z axes mutually crossing at right angles;

(c) adjusting at least one of the primarily calculated pitch angle and roll angle using an output value of the acceleration sensor of the Z axis; and (d) calculating the azimuth using the adjusted pitch angle and roll angle and an output value of a geomagnetic measurement module.

16. At least one computer readable medium as recited in claim 15, wherein in the step of (b), the output values of each acceleration sensor of the X, Y and Z axes are normalized into values of a preset range using the following equations:

$$AX_{norm} = \frac{(AX_{raw} - AX_{offset})}{AX_{Scale}}$$

$$AY_{norm} = \frac{(AY_{raw} - AY_{offset})}{AY_{Scale}} \text{ and,}$$

$$AZ_{norm} = \frac{(AZ_{raw} - AZ_{offset})}{AZ_{Scale}}$$

where $AX_{norm}$, $AY_{norm}$ and $AZ_{norm}$ are the normalized output values of each acceleration sensor of the X, Y and Z axes respectively, $AX_{raw}$, $AY_{raw}$ and $AZ_{raw}$ are the real output values of each acceleration sensor of the X, Y and Z axes respectively, $AX_{offset}$, $AY_{offset}$ and $AZ_{offset}$ are the preset offset values of each acceleration sensor of the X, Y and Z axes respectively, and $AX_{Scale}$, $AY_{Scale}$ and $AZ_{Scale}$ are the preset scale values of each acceleration sensor of the X, Y and Z axes respectively.

17. At least one computer readable medium as recited in claim 16, wherein in the step of (b), the pitch angle and roll angle are primarily calculated using the following equations:

$$\theta_X = \sin^{-1}(AX_{norm})$$

$$\phi_Y = \sin^{-1}(AY_{norm}/\cos\theta_X)$$

-continued $$\theta_Z = \sin^{-1}(AZ_{mod})\left\{\text{wherein, } AZ_{mod} = \frac{AZ_{norm}}{\cos\phi_Y}\right\} \text{ and}$$

$$\phi_Z = \sin^{-1}(AZ_{mod}/\cos\theta_X)\left\{\text{wherein, } AZ_{mod} = \frac{AZ_{norm}}{\cos\theta_X}\right\},$$

where $\theta_X$ is the pitch angle calculated using the acceleration sensor of the X axis, $\phi_Y$ is the roll angle calculated using the acceleration sensor of the Y axis, $\theta_Z$ is the pitch angle calculated using the acceleration sensor of the Z axis, and $\phi_Z$ is the roll angle calculated using the acceleration sensor of the Z axis.

18. At least one computer readable medium as recited in claim 17, wherein in the step of (c), the pitch angle is readjusted in a manner that when the $\theta_X$ is between 0° and 45°, if the $\theta_Z$ is 0° or more, the $\theta_X$ becomes the pitch angle, or if the $\theta_Z$ is under 0°, 180°–$\theta_X$ becomes the pitch angle, when the $\theta_X$ is 45° or more, if $\phi_Y$ is under 45°, 90°–$\theta_Z$ becomes the pitch angle, or if the $\phi_Y$ is 45° or more, the $\theta_X$ becomes the pitch angle, when the $\theta_X$ is between –45° and 0°, if the $\theta_Z$ is 0° or more, the $\theta_X$ becomes the pitch angle, or if the $\theta_Z$ is under 0°, –180°–$\theta_X$ becomes the pitch angle, or when the $\theta_X$ is under –45°, if the $\phi_Y$ is under 45°, $\theta_Z$–90° becomes the pitch angle, or if the $\phi_Y$ is 45° or more, the $\theta_X$ becomes the pitch angle.

19. At least one computer readable medium as recited in claim 18, wherein in the step of (c), the roll angle is readjusted in a manner that when the $\phi_Y$ is between 0° and 45°, if the $\phi_Z$ is 0° or more, the $\phi_Z$ becomes the roll angle, or if the $\phi_Z$ is under 0°, 180°–$\phi_Y$ becomes the roll angle, when the $\phi_Y$ is 45° or more, if the $\phi_X$ is under 45°, 90°–$\phi_Z$ becomes the roll angle, or if the $\theta_X$ is 45° or more, the $\phi_Y$ becomes the roll angle, when the $\phi_Y$ is between –45° and 0°, if the $\phi_Z$ is 0° or more, the $\phi_Y$ becomes the roll angle, or if the $\phi_Z$ is under 0°, –180°–$\phi_Y$ becomes the roll angle, or when the $\phi_Y$ is under –45°, if the $\theta_X$ is under 45°, $\phi_Z$–90° becomes the roll angle, or if the $\theta_X$ is 45° or more, the $\phi_Y$ becomes the roll angle.

20. At least one computer readable medium as recited in 16, wherein in the step of (a), the output values of each flux gate of the X, Y and Z axes are normalized into values of a preset range using the following equations:

$$X_{norm} = \frac{(X_{raw} - X_{offset})}{X_{Scale}}$$

$$Y_{norm} = \frac{(Y_{raw} - Y_{offset})}{Y_{Scale}} \text{ and,}$$

$$Z_{norm} = \frac{(Z_{raw} - Z_{offset})}{Z_{Scale}}$$

where $X_{norm}$, $Y_{norm}$ and $Z_{norm}$ are the normalized output values of each flux gate of the X, Y and Z axes respectively, $X_{raw}$, $Y_{raw}$ and $Z_{raw}$ are the real output values of each flux gate of the X, Y and Z axes respectively, $X_{offset}$, $Y_{offset}$ and $Z_{offset}$ are the preset offset values of each flux gate of the X, Y and Z axes respectively, and $X_{Scale}$, $Y_{Scale}$ and $Z_{Scale}$ are the preset scale values of each flux gate of the X, Y and Z axes respectively.

21. At least one computer readable medium as recited in 20, wherein in the step of (d), the azimuth is calculated by applying the normalized output values of each flux gate of the X, Y and Z and the readjusted pitch angle and roll angle to the following equation:

$$\psi = \tan^{-1}\left(\frac{Y_{norm}*\cos\phi - Z_{norm}*\sin\phi}{X_{norm}*\cos\theta - Y_{norm}*\sin\theta*\sin\phi - Z_{norm}*\sin\theta*\cos\phi}\right),$$

where $X_{norm}$, $Y_{norm}$ and $Z_{norm}$ are the normalized output values of each flux gate of the X, Y and Z axes respectively, $\theta$ is the pitch angle, and $\phi$ is the roll angle.

22. A geomagnetic sensor, comprising:
a geomagnetic measurement module including flux gates of X, Y and Z axes mutually crossing at right angles;
a tilt measurement module including acceleration sensors of X, Y and Z axes mutually crossing at right angles;
a tilt calculator primarily calculating a pitch angle and a roll angle using output values of the acceleration sensors of the X and Y axes, and performing a second calculation by adjusting at least one of the primarily calculated pitch angle and roll angle according to a size of output values of the acceleration sensors of the X, Y and Z axes; and
a controller calculating an azimuth using the adjusted at least one primarily calculated pitch angle and roll angle, and an output value of the geomagnetic measurement module.

23. A method of calculating an azimuth, comprising:
(a) calculating output values of flux gates of X, Y and Z axes using the flux gates of the X, Y and Z axes mutually crossing at right angles;
(b) primarily calculating a pitch angle and a roll angle using acceleration sensors of X, and Y axes mutually crossing at right angles;
(c) adjusting, after the primarily calculating a pitch angle and a roll angle, at least one of the primarily calculated pitch angle and roll angle according to a size of output values of the acceleration sensors of the X, and Y axes, and an acceleration sensor of the Z axis; and
(d) calculating the azimuth using the adjusted pitch angle and roll angle and the output values of the flux gates.

24. A computer readable medium storing instructions that control at least one processor to perform a method of calculating an azimuth, comprising:
(a) calculating output values of flux gates of X, Y and Z axes using the flux gates of the X, Y and Z axes mutually crossing at right angles;
(b) primarily calculating a pitch angle and a roll angle using acceleration sensors of X, Y and Z axes mutually crossing at right angles;
(c) adjusting at least one of the primarily calculated pitch angle and roll angle according to a size of output values of the acceleration sensors of the X, Y and Z axes; and
(d) calculating the azimuth using the adjusted pitch angle and roll angle and the output values of the flux gates.

* * * * *

UNITED STATES PATENT AND TRADEMARK OFFICE
CERTIFICATE OF CORRECTION

PATENT NO. : 7,809,505 B2  
APPLICATION NO. : 11/451477  
DATED : October 5, 2010  
INVENTOR(S) : Woo-Jong Lee et al.

Page 1 of 3

It is certified that error appears in the above-identified patent and that said Letters Patent is hereby corrected as shown below:

Column 10, Line 65 in Claim 2, delete " $AY_{norm} = \frac{(AY_{raw} - AY_{offset})}{AY_{Scale}}$ and, "

and insert -- $AY_{norm} = \frac{(AY_{raw} - AY_{offset})}{AY_{Scale}}$ and --, therefor.

Column 11, Lines 2-4 in Claim 2, after " $AZ_{norm} = \frac{(AZ_{raw} - AZ_{offset})}{AZ_{Scale}}$ " insert -- , --.

Column 11, Lines 23-26 in Claim 3, delete

" $\theta_Z = \sin^{-1}(AZ_{mod})\{wherein,\ AZ_{mod} = \frac{AZ_{norm}}{\cos\phi_Y}\}$ and ,

$\phi_Z = \sin^{-1}(AZ_{mod}/\cos\theta_X)\{wherein,\ AZ_{mod} = \frac{AZ_{norm}}{\cos\theta_X}\}$ "

and insert

-- $\theta_Z = \sin^{-1}(AZ_{mod})\{wherein,\ AZ_{mod} = \frac{AZ_{norm}}{\cos\phi_Y}\}$ and $\phi_Z = \sin^{-1}(AZ_{mod}/\cos\theta_X)\{wherein,\ AZ_{mod} = \frac{AZ_{norm}}{\cos\theta_X}\}$ , --, therefor.

Signed and Sealed this  
Second Day of October, 2012

David J. Kappos  
*Director of the United States Patent and Trademark Office*

CERTIFICATE OF CORRECTION (continued)
U.S. Pat. No. 7,809,505 B2

Column 12, Lines 5-8 in Claim 6, delete

" $$Y_{norm} = \frac{(Y_{raw} - Y_{offset})}{Y_{Scale}} \text{ and,}$$

$$Z_{norm} = \frac{(Z_{raw} - Z_{offset})}{Z_{Scale}}$$ "

and insert

-- $$Y_{norm} = \frac{(Y_{raw} - Y_{offset})}{Y_{Scale}} \text{ and}$$

$$Z_{norm} = \frac{(Z_{raw} - Z_{offset})}{Z_{Scale}},$$ --, therefor.

Column 12, Lines 53-57 in Claim 9, delete

" $$AY_{norm} = \frac{(AY_{raw} - AY_{offset})}{AY_{Scale}} \text{ and,}$$

$$AZ_{norm} = \frac{(AZ_{raw} - AZ_{offset})}{AZ_{Scale}}$$ "

and insert

-- $$AY_{norm} = \frac{(AY_{raw} - AY_{offset})}{AY_{Scale}} \text{ and}$$

$$AZ_{norm} = \frac{(AZ_{raw} - AZ_{offset})}{AZ_{Scale}},$$ --, therefor.

Column 13, Lines 58-61 in Claim 13, delete

" $$Y_{norm} = \frac{(Y_{raw} - Y_{offset})}{Y_{Scale}} \text{ and,}$$

$$Z_{norm} = \frac{(Z_{raw} - Z_{offset})}{Z_{Scale}}$$ "

and insert $$Y_{norm} = \frac{(Y_{raw} - Y_{offset})}{Y_{Scale}} \text{ and}$$

$$Z_{norm} = \frac{(Z_{raw} - Z_{offset})}{Z_{Scale}},$$

--, therefor.

Column 14, Lines 41-44 in Claim 16, delete $$AY_{norm} = \frac{(AY_{raw} - AY_{offset})}{AY_{Scale}} \text{ and,}$$

$$AZ_{norm} = \frac{(AZ_{raw} - AZ_{offset})}{AZ_{Scale}}$$

" "

and insert $$AY_{norm} = \frac{(AY_{raw} - AY_{offset})}{AY_{Scale}} \text{ and}$$

$$AZ_{norm} = \frac{(AZ_{raw} - AZ_{offset})}{AZ_{Scale}},$$

--, therefor.

Column 15, Lines 53-57 in Claim 20, delete $$Y_{norm} = \frac{(Y_{raw} - Y_{offset})}{Y_{Scale}} \text{ and,}$$

$$Z_{norm} = \frac{(Z_{raw} - Z_{offset})}{Z_{Scale}}$$

" "

and insert $$Y_{norm} = \frac{(Y_{raw} - Y_{offset})}{Y_{Scale}} \text{ and}$$

$$Z_{norm} = \frac{(Z_{raw} - Z_{offset})}{Z_{Scale}},$$

--, therefor.